(12) United States Patent
Stolzer et al.

(10) Patent No.: US 10,850,417 B2
(45) Date of Patent: Dec. 1, 2020

(54) MACHINE TOOL, IN PARTICULAR SAWING MACHINE, AND SYSTEM FOR AN OPTIMIZED OPERATION OF A MACHINE TOOL

(71) Applicant: KEURO Besitz GmbH & Co. EDV-Dienstleistungs KG, Achern (DE)

(72) Inventors: Armin Stolzer, Baden-Baden (DE); Sonke Florian Krebber, Baden-Baden (DE)

(73) Assignee: KEURO Besitz GmbH & Co. KG EDV—Dienstleistungs KG, Achern (DE)

( * ) Notice: Subject to any disclaimer, the term of this patent is extended or adjusted under 35 U.S.C. 154(b) by 39 days.

(21) Appl. No.: 16/158,782

(22) Filed: Oct. 12, 2018

(65) Prior Publication Data

US 2019/0143550 A1    May 16, 2019

(30) Foreign Application Priority Data

Nov. 10, 2017  (DE) .......................... 10 2017 126 434

(51) Int. Cl.
| | |
|---|---|
| *B26D 5/00* | (2006.01) |
| *B26D 5/30* | (2006.01) |
| *B23D 59/00* | (2006.01) |
| *B23D 53/00* | (2006.01) |
| *B26D 1/46* | (2006.01) |
| *B26D 5/02* | (2006.01) |
| *B26D 7/00* | (2006.01) |
| *B26D 7/01* | (2006.01) |

(52) U.S. Cl.
CPC .............. *B26D 5/005* (2013.01); *B23D 53/00* (2013.01); *B23D 59/001* (2013.01); (Continued)

(58) Field of Classification Search
CPC .... B23D 59/001; B23D 59/008; B26D 53/00; B26D 5/005; B26D 1/46; B26D 7/01; (Continued)

(56) References Cited

U.S. PATENT DOCUMENTS

| | | |
|---|---|---|
| 4,742,470 A | 5/1988 | Juengel |
| 4,896,273 A | 1/1990 | Moore et al. |

(Continued)

FOREIGN PATENT DOCUMENTS

| | | |
|---|---|---|
| DE | 20108500 | 10/2001 |
| DE | 202016106787 | 3/2017 |

(Continued)

OTHER PUBLICATIONS

Hideto Nakajima, Unitary Management System for Cutting Tool, Machines and Tools, Kogyo Chosakai Publishing Co., Ltd., vol. 45, No. 2, pp. 55-58, Feb. 2001.

*Primary Examiner* — Ghassem Alie
(74) *Attorney, Agent, or Firm* — Volpe Koenig

(57) ABSTRACT

A machine tool, in particular a sawing machine, with a tool for metal cutting, in particular a saw band or saw blade, a drive device for driving and/or moving the tool, a controller for the drive device in order to control and/or regulate the drive device with a process dataset, as well as a communication device for data exchange between the controller and an external data memory and/or an external computer. The controller includes a detector for identifying the tool. A system for optimized operation of such a machine tool which additionally includes an external data memory and/or external computer is also provided.

6 Claims, 7 Drawing Sheets

(52) U.S. Cl.
CPC ............ *B23D 59/008* (2013.01); *B26D 5/30* (2013.01); *B26D 1/46* (2013.01); *B26D 5/02* (2013.01); *B26D 7/0006* (2013.01); *B26D 7/01* (2013.01)

(58) Field of Classification Search
CPC . B26D 5/30; B26D 5/02; B26D 7/006; B23Q 17/2457; G05B 19/128; G05B 2219/31304; G05B 2219/31095; G05B 2219/33199; H02P 29/032; H02H 7/0854; B25B 21/00; B25B 45/008; B25B 23/147
USPC .................. 83/39; 700/168, 173, 175; 173/1
See application file for complete search history.

(56) References Cited

U.S. PATENT DOCUMENTS

| | | | |
|---|---|---|---|
| 2003/0220809 A1 | 11/2003 | Komine et al. | |
| 2006/0234617 A1* | 10/2006 | Francis ................ | B23D 59/001 452/174 |
| 2007/0150089 A1* | 6/2007 | Dolansky ............. | G05B 19/128 700/173 |
| 2008/0021590 A1* | 1/2008 | Vanko .................. | B23B 45/008 700/168 |
| 2009/0001878 A1 | 1/2009 | Qiu et al. | |
| 2012/0303674 A1 | 11/2012 | Boensch et al. | |
| 2016/0176007 A1 | 6/2016 | Wolf et al. | |
| 2017/0265961 A1* | 9/2017 | Kato ........................ | A61C 5/44 |
| 2018/0133873 A1* | 5/2018 | Mergener ............. | H02J 7/0024 |
| 2018/0159937 A1 | 6/2018 | Stolzer et al. | |

FOREIGN PATENT DOCUMENTS

| | | |
|---|---|---|
| EP | 0230642 | 8/1987 |
| EP | 1884325 | 2/2008 |
| JP | S62181857 | 8/1987 |
| JP | 2009526296 | 7/2000 |
| JP | 2003001340 | 1/2003 |
| WO | 2006104929 | 10/2006 |

* cited by examiner

Code examples:

```
1    {
            "AUTH KEY":"saf897fkjsdf897sdfkjsdfß31k234g4hjhjksdfbnasasdsad4",
            "Request Tool Parameter":
            {
                    "Req-ID":"5706102045-4711",
                    "Maschine":
                    {
                            "Manufacturer":"KASTO",
                            "Typ":"win A3.3",
                            "SN":5706102045
                    },
                    "Tool-ID":"00014711587"
            }
     }

2    {
            "AUTH KEY":"saf897fkjsdf897sdfkjsdfß31k234g4hjhjksdfbnasasdsad4",
            "Send Tool Parameter":
            {
                    "Tool":
                    {
                            "Manufacturer":"WIKUS",
                            "Typ":"Futura Premium",
                            "ZpZ":"2-3",
                            "coated":"yes",
                            "width":1.3,
                            "height":54,
                            "tooth":"T",
                            "SN":123456789,
                            "cutted area":0
                    }
            }
     }

3    {
            "AUTH KEY":"saf897fkjsdf897sdfkjsdfß31k234g4hjhjksdfbnasasdsad4",
            "Request Metal Parameter":
            {
                    "Req-ID":"5706102045-4711",
                    "Maschine":
                    {
                            "Manufacturer":"KASTO",
                            "Typ":"win A3.3",
                            "SN":5706102045
                    },
                    "Metal-ID":"00014711587"
            }
     }
```

Fig. 4A

```
4   {
        "AUTH KEY":"saf897fkjsdf897sdfkjsdf831k234g4hjhjksdfbnasasdsad4",
        "Send Metal Parameter":
        {
            "Material":
            {
                "ISO":"1.4575",
                "strength":900,
                "Shape":"Round",
                "diameter":250,
                "length":null,
                "height":null
            }
        }
    }

5   {
        "AUTH KEY":"saf897fkjsdf897sdfkjsdf831k234g4hjhjksdfbnasasdsad4",
        "Request Technology Parameter":
        {
            "Req-ID":"5706102045-4711",
            "Maschine":
            {
                "Manufacturer":"KASTO",
                "Typ":"win A3.3",
                "SN":5706102045
            },
            "Tool":
            {
                "Manufacturer":"WIKUS",
                "Typ":"Futura Premium",
                "ZpZ":"2-3",
                "coated":"yes",
                "width":1.3,
                "height":54,
                "tooth":"T",
                "SN":123456789,
                "cutted area":0
            },
            "Material":
            {
                "ISO":"1.4575",
                "strength":900,
                "Shape":"Round",
                "diameter":250,
                "length":null,
                "height":null
            }
        }
    }
```

Fig. 4B

6
```
{
    "AUTH KEY":"aslkfd7894235bjr789wehjsdf",
    "Send Technology Parameter":
    {
        "Req-ID":"5706102045-4711",
        "Technology Parameter":
        {
            "Vc":110,
            "Vf":30,
            "coolant":"on",
            "MinOil":"off",
            "KASTO sense":"on",
            "KASTO respond":"on"
        }
    }
}
```

7
```
{
    "AUTH KEY":"saf897fkjsdf897sdfkjsdf831k234g4hjhjksdfbnasasdsad4",
    "Send Process Statistic":
    {
        "Cut-ID":"5706102045-4711",
        "Maschine":
        {
            "Manufacturer":"KASTO",
            "Typ":"win A3.3",
            "SN":5706102045
        },
        "Tool":
        {
            "Manufacturer":"WIKUS",
            "Typ":"Future Premium",
            "Zp2":"2-3",
            "coated":"yes",
            "width":1.3,
            "height":54,
            "tooth":"T",
            "SN":123456789,
            "cutted area":0
        },
        "Material":
        {
            "ISO":"1.4575",
            "strength":900,
            "Shape":"Round",
            "diameter":250,
            "length":null,
            "height":null
        }
        "Technology Parameter":
        {
            "Vc":110,
            "Vf":30,
            "coolant":"on",
            "MinOil":"off",
            "KASTO sense":"on",
            "KASTO respond":"on"
        }
```

Fig. 4C

```
"Sensor Data":
{
    "cut time":95.6,
    "temp":21.5,
    "band deviation":0.012,
    "momentum":null
  }
 }
}
```

Fig. 4D

MACHINE TOOL, IN PARTICULAR SAWING MACHINE, AND SYSTEM FOR AN OPTIMIZED OPERATION OF A MACHINE TOOL

INCORPORATION BY REFERENCE

The following documents are incorporated herein by reference as if fully set forth in German Patent Application No. 10 2017 126 434.5, filed Nov. 10, 2017.

BACKGROUND

The invention relates to a machine tool, in particular a sawing machine, with a tool for metal cutting, in particular a saw band or saw blade. Such a machine tool additionally comprises a drive device for driving and/or moving the tool, a controller for the drive device in order to control and/or regulate the drive device with a process dataset as well as a communication device for data exchange between the controller and an external data memory and/or an external computer.

The invention additionally relates to a system for an optimized operation of a machine tool, in particular a sawing machine. In addition to the above-mentioned machine tool, the system comprises at least one external computer and/or at least one external data memory, wherein the communication between the controller of the machine tool and the external data memory and/or the external computer can take place via the Internet.

Machine tools of the present type accordingly include a tool, which cuts metal. This tool is subject to wear and must be replaced from time to time. Furthermore, it is usual to be able to insert different tools into the machine tool in order, for example to machine different materials in the case of sawing machines or for example to produce different-sized bores in the case of drilling machines.

Depending on the current tool and optionally on the material of the workpiece currently being machined, different movement sequences of the machine tool must be selected in order, on the one hand, not to overstress the tool or obtain a poor working result and on the other hand, to keep the machining durations as short as possible in order to optimize the power of the machine tool. A band saw machine, for example, comprises a drive device, which comprises at least one motor for driving the circulating saw band, i.e. the tool, a motor for moving the circulating saw band relative to the workpiece for the sawing progress as well as usually motors for moving and fixing the workpiece in the machine tool. A circular sawing machine for example also comprises a drive device with separate drives for rotating the saw blade as the tool and for moving the rotating saw blade relative to the workpiece.

At least the motor for driving the tool and the motor for moving the tool must be controlled or regulated with a process dataset, which in particular must be selected tool-specifically, i.e. adapted to the currently provided tool in order, on the one hand, not to overload the tool and on the other hand, to utilize the performance of the machine tool. For this purpose, usually either the machine manufacturer or the tool manufacturer provide tool-specific process dataset specifications, optionally differentiated according to different workpiece materials. These process dataset specifications are based on empirical values, which have been obtained in test runs. The machine operator can take these process dataset specifications from lists, which are either held in readiness during operation or in particular can be downloaded from the tool manufacturer or machine manufacturer via the Internet.

The communication device of a machine tool of the present type is usually used for data exchange between the controller and a computer of a service engineer so that the service engineer can switch to the controller for maintenance purposes or to eliminate a fault, in order to be able to carry out the necessary work by remote maintenance.

After a tool change or when changing the material to be machined, the machine operator must accordingly input new tool-specific process dataset specifications into the controller of the machine tool in order to ensure an optimized operation of the same. If this is omitted or this is performed incorrectly, this can on the one hand result in unnecessarily long machining times or on the other hand result in poor working results or even result in damage to the tool.

SUMMARY

It is therefore the object of the present invention to provide a machine tool of the type mentioned initially and a system for an optimized operation of a machine tool by which the said error source is eliminated.

This object is achieved by a machine tool and by a system for optimized operation of a machine tool having one or more Features of the invention. Preferred embodiments of the machine tool according to the invention are described below; advantageous embodiments of the system according to the invention are also described below.

The machine tool according to the invention with a tool for metal cutting, a drive device for driving and/or moving the tool, a controller for the drive device in order to control and/or regulate the drive device with a process dataset, as well as a communication device is therefore characterized in that the controller comprises detection means for identifying the tool. The machine tool according to the invention can therefore independently detect which tool is provided for the current work process. A main source of error is thus eliminated since the operator receives the information as to which tool is currently inserted at the operating interface of the controller.

For this purpose the tool can be provided with a coding, wherein then the detection means according to the invention of the controller substantially consists of at least one sensor for detecting the coding. This coding can be a number, a barcode, a matrix code, an RFID chip, and the like. These codings have in common that they can be detected by contactless sensors.

If the machine tool for example is a band saw machine, the code can be applied in particular as barcode by laser engraving or by an imprint on the saw band. A single slow circulation of this saw band can ensure after a change of tool that the code is read by the corresponding sensor.

If the machine tool is a circular saw, the tool, there the sawblade, can also be provided with a code. Here however, it is also easily possible to configure the code as an RFID chip and apply it to the sawblade.

The coding can also be configured in such a manner that it contains the tool-specific process dataset specifications in a machine-readable manner, which for example is possible with a matrix code. The detection means of the controller can then not only identify the tool but also at the same time read in the tool-specific process dataset specifications into the controller. An intervention of the user is not necessary in this case so that here any source of error is eliminated.

It is particularly preferred within the framework of the present invention however if the machine tool according to the invention has a controller with an adjustment unit which, via the communication device for data exchange between the controller and an external data memory or computer, makes contact with this data memory and/or this computer in order to download tool-specific process dataset specifications for the identified tool deposited in the data memory and/or computer and/or adjust the current process dataset with tool-specific process dataset specifications for the identified tool deposited in the data memory and/or computer.

The detection means of the controller of a machine tool according to the invention must then actually only identify the tool, for example, by an identification number, whereupon the controller with its adjustment unit obtains tool-specific process dataset specifications via the communication device from an external data memory and/or an external computer and immediately reads them into the dedicated working memory in order to be able to carry out the machining process in an optimized manner. Here also there is no intervention of the operator so that here also the crucial error source is eliminated.

The external data memory, which the controller of the machine tool according to the invention accesses in order to download tool-specific process dataset specifications or make an adjustment, need not be any individual delimited data memory. On the contrary, within the framework of the present invention it can be provided that the external data memory is formed by the entirety of the information to be found on the Internet. In this case, the communication device can be configured so that it determines the required information independently via the Internet, for example by a list of relevant manufacturers or with the aid of Internet search engines.

Such an independent adjustment with information currently available on the Internet can then also lead to better results when access to the information available on the Internet is made externally supplementarily or additionally to downloading tool-specific process dataset specifications.

According to a further preferred embodiment of the machine tool according to the invention, the controller contains machine-specific correction values for at least individual tool-specific process dataset specifications in order to adapt the tool-specific process dataset specifications to the machine tool.

This is in particular of great advantage when the machine tool can be operated with process datasets, which enable shorter machining times compared with the process dataset specifications. This is frequently the case with particularly powerful machine tools since tool manufacturers publish tool-specific process dataset specifications, which must also be suitable for less powerful machine tools. For the example of a band saw machine, this can for example involve the vibrations of the saw band during the sawing process: a powerful band saw machine which performs a sawing process with particularly low vibrations of the saw band can be operated at higher cutting speeds than a less powerful saw band machine with the same tool.

The controller of the machine tool according to the invention can also contain an algorithm, which can identify the material to be machined by the machine tool by determining process parameters by sensors and/or from feedback of the drive device during a test operation, which parameters indicate the material. This can be the torque applied to the tool when machining the workpiece or a corresponding counter-force, optionally combined with geometrical data, information relating to the weight of the workpiece as well as, for example, in the case of a band saw machine, the vibrations of the saw band which occur during sawing and the like.

According to this further development of the machine tool according to the invention, this independently identifies both the inserted tool and also the material to be machined and can optionally also independently download tool-specific process dataset specifications via the communication device and modify these with material-specific correction values and optionally also with machine-specific correction values in order to create an optimized process dataset, by which the drive device of the machine tool is then controlled or regulated. The machine operator then does not need to concern himself with anything in this case and corresponding error sources are completely eliminated.

The system according to the invention for an optimized operation of a machine tool, which is not necessarily provided with detection means for identifying the tool, comprises in addition to the machine tool with a tool for metal cutting, comprising a drive device for driving and/or moving the tool, and comprising a controller for the drive device in order to control and/or regulate the drive device with a process dataset, further comprises at least one external computer and/or at least one external data memory as well as a communication device for data exchange between the controller of the machine tool and the external data memory and/or the external computer. According to the invention, the controller of the machine tool contains an adjustment unit in order to download tool-specific process dataset specifications for the tool deposited in the data memory and/or computer and/or to adjust the current process dataset with tool-specific process dataset specifications for the tool deposited in the data memory and/or computer.

For this purpose, the system according to the invention preferably uses a machine tool according to the invention, the controller of which comprises detection means for identifying the tool.

The system comprising a machine tool, which is located at a user, and at least one external computer or at least one external data memory can, for example, be constructed so that an external computer or data memory are localized at the machine manufacturer and a computer or data memory are localized at the tool manufacturer and all these components are interlinked, in particular via the Internet.

The communication between the controller of the machine tool and the external computer or data memory enables various diverse interactions. Thus, machine-specific correction values for at least individual tool-specific process dataset specifications in order to adapt the tool-specific process dataset specifications to the machine tool can be held in readiness not only as described above in the controller of the machine tool itself but also in the external computer or data memory. This enables in particular a dynamic further development of these correction values when, for example at the machine manufacturer, there are new findings, by which the process datasets can be further optimized for specific machine tools.

It is particularly preferred here if the controller of the machine tools contains an algorithm which determines machine-specific and/or material-specific correction values for the tool-specific process dataset specifications during operation of the machine tool. This can be accomplished automatically by process parameters determined during operation, which for example are determined by sensors and/or from feedback of the drive device. Alternatively or additionally, operator inputs, for example, for the machined material or for the working result, can form the basis for the algorithm, which determines from this machine-specific and/or material-specific correction values.

Using the adjustment unit of the controller, the machine tool outputs machine-specific and/or material-specific correction values calculated by the algorithm to the external data memory and/or the external computer so that the tool-specific process dataset specifications can be modified there in a machine-specific manner. This is therefore a self-learning system which continuously optimizes the tool-specific process dataset specifications in a machine-specific manner.

It is quite particularly advantageous here if a multiplicity of same-type machine tools communicate with one and the same external data memory and/or external computer. This is because if the data memory and/or the computer are configured so that they adapt the deposited tool-specific process dataset specifications by the use of feedback obtained from the machine tools in a machine-specific manner, in particular using statistical methods, the tool-specific process dataset specifications are continuously optimized so that, for example correction values of one machine tool which are used to optimize the tool-specific process dataset specifications are automatically made available to all the other machine tools of the same type. Furthermore, there is a self-learning effect with a plurality of data, the scatter of which is evaluated accordingly and can be incorporated in the optimization of the tool-specific process dataset specifications. This therefore involves a continuously updated real-time field test, which dynamically adapts the tool-specific process dataset specifications so that these become increasingly better in a machine-specific manner as the processed data set amount increases.

It can also be provided to use a controller of the machine tool without an algorithm but to notify to the data memory and/or the computer only the process parameters determined by sensors and/or from feedback of the drive device during operation of the machine tool and/or operator inputs during operation of the machine tool, and provide an algorithm in the data memory and/or computer, which calculates from these acknowledged process parameters material-specific correction values for the tool-specific process dataset specifications in order to modify the tool-specific process dataset specifications in a machine-specific manner. In the case of band saw machines, for example, such process parameters can be the cutting speed, the vibrations which occur, the band profile during sawing, and also the lifetime of the saw band.

This variant also results in a system which is continuously optimized by producing a type of dynamic database for the tool-specific process dataset specifications, which are continuously improved as a result of the feedback obtained from a plurality of machine tools of the same type.

Preferably this further development of the system according to the invention comprises a relationship of three different participants: the external data memory, which can be held in readiness in particular at the tool manufacturer, contains the tool-specific process dataset specifications, whereas the external computer, which in particular is located at the machine manufacturer, contains machine-specific and/or material-specific correction values for the tool-specific process dataset specifications held in readiness in the external data memory and continuously optimizes these by using the feedback obtained from the machine tools for continuous machine-specific adaptation of the correction values, in particular using statistical methods, whereas conversely the machine-specific and/or material-specific correction values thus continuously optimized are made available to the adjustment unit of the controller of each individual machine tool.

Finally, within the framework of the system according to the invention, it can be provided that the data memory and/or computer contain an algorithm, which determines the material to be machined by the machine tool from process parameters of which it is notified by the machine tool and adapts the tool-specific process dataset specifications independently using material-specific correction values. These process parameters are determined in the machine tool during operation or during a test operation by the controller, and specifically by sensors and/or from feedback of the drive device, such as for example the drive torque required for a specific feeding movement and a specific drive speed. In such a system, the operator of the machine tool again need not concern himself with anything since the machine tool identifies or arranges to identify both the tool and also the material, and specifically by communication with the external computer or data memory. The latter has the advantage that a machine tool itself need not be fitted or retrofitted with a corresponding algorithm. A communication device is sufficient for data exchange between the controller of the machine tool and the external data memory or computer.

BRIEF DESCRIPTION OF THE DRAWINGS

An exemplary embodiment for a system configured according to the invention for an optimized operation of a machine tool is described and explained in detail hereinafter with reference to a band saw machine. In the figures:

FIGS. 4A-4D show a code example for the data transfer according to FIG. 3.

DETAILED DESCRIPTION

Figure 1:
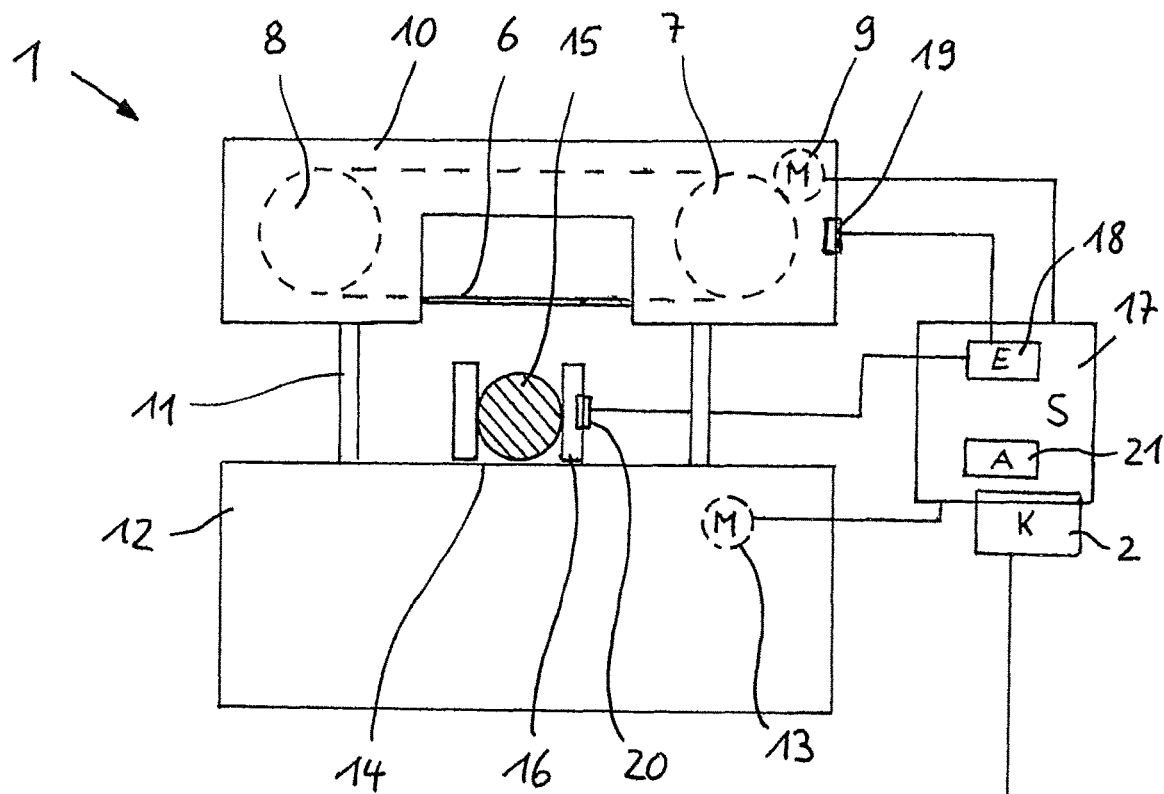
FIG. 1 shows a schematic diagram of the essential functional parts of a system configured according to the invention.
Figure 1:
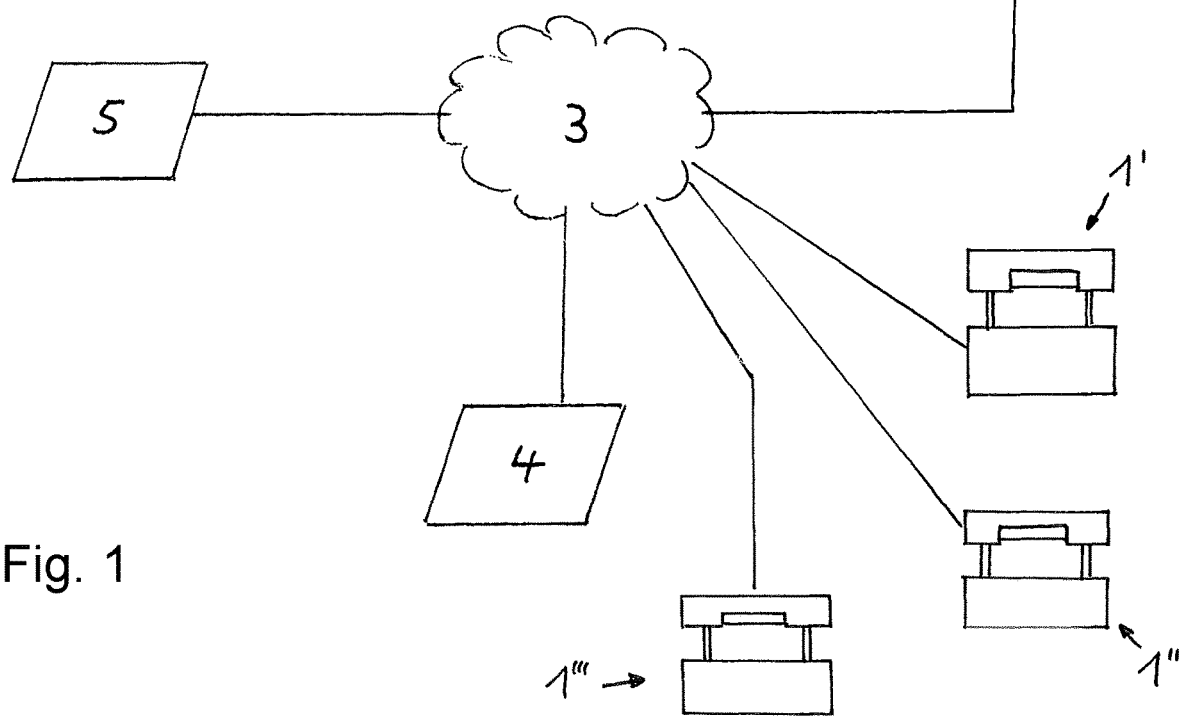

FIG. 1 shows schematically a system for optimized operation of a machine tool, which embodies a possible configuration of the invention. A machine tool 1, here a band saw machine, is located at the user and operating there. Via communication device 2, for example, a router, the machine tool 1 can be connected via the Internet 3 to an external computer 4, which is located at the machine tool manufacturer, and to an external data memory 5. The latter is located at the manufacturer of the tool 6 for metal cutting, in the present case therefore the saw band of the band saw machine. A multiplicity of same-type machine tools 1', 1", 1''' can communicate with one and the same external data memory and/or external computer.

The machine tool 1 configured as a band saw machine contains, as mentioned, a saw band as cutting tool 6, which runs around a driven guide roller 7 and co-running guide roller 8. To this end, the guide roller 7 is driven by a drive motor 9.

The saw band and the two guide rollers 7, 8 are arranged in a saw upper part 10. This can be lowered along two pillars 11 onto a saw lower part 12 in order to move the tool 6, i.e. the saw band in a saw feeding movement. For this purpose the machine contains a feed motor 13. A workpiece 15 to be sawn rests on the upper side of the saw lower part 12, which forms a sawing table 14. This workpiece is held in position by two clamping jaws 16. As a result of a lowering of the saw upper part 10, the saw band moves toward the workpiece 15 and ultimately through this as far as the sawing table 14.

The drive motor 9 for driving the tool 6 and the feed motor 13, which is used to move the tool 6 in a saw feeding movement, are controlled by a controller 17, which is usually integrated in the housing of the machine tool 1 and comprises a control computer with corresponding control software. According to the invention, this controller 17, for example as software module, contains detection means 18, which in the present case also comprises two sensors, one sensor 19 for detecting a coding of the tool 6 and one sensor 20 for detecting a coding on the workpiece 15. The detection means 18 of the controller 17 is additionally connected to the drive motor 9, more precisely to its frequency converter, in order to continuously collect information relating to the torque delivered by the drive motor 9 to the driven guide roller 7 and therefore to the tool 6, for example, by analyzing the active current delivered by the frequency converter. These data are linked to the control data for the feed motor 13, which enables conclusions to be drawn as to whether the speed of the saw feed is optimal or can be increased or should be reduced in order not to overload the tool.

The tool 6 is provided with a barcode, which is embedded in the saw band. This barcode can be read with the sensor 19 as soon as it passes the sensor 19. The workpiece 15 is also coded; this is a QR code, which can be read by the sensor 20, which is arranged in the vicinity of the clamping jaws 16. This QR code can already contain the information, which can be used by the controller 17 to execute an adapted control program or adapt the control program by which the drive and feed motors 9, 13 are activated in a material-specific manner. It is preferred however if, on the basis of the detected QR code, the controller 17 obtains information from the Internet via the communication device 2 or via the Internet 3 obtains further information from the external computer 4 or the external data memory 5, by which a sawing cut is performed with optimized parameters for the drive motor 9 and the feed motor 13.

In a corresponding manner it is preferred if, on the basis of the coding of the tool 6 detected by the sensor 19, the controller 17 via the communication device 2 requests current data from the Internet 3, the data memory 5, or the computer 4, by which the sawing process can be optimized, for example, relating to the optimal band tension of the tool 6 configured as a saw band and in particular the optimal circumferential speed and, associated with this, the optimal or still compatible saw feed speed.

An adjustment unit 21, which is usually integrated in the controller 17 and in particular can be configured as a software module, provides for current adjustment of the process dataset specifications obtained via the communication device 2 with the process dataset already present in the controller 17, with which this controls the drive and feed motors 9, 13.

At the same time, the controller 17 with the adjustment unit 21 can provide feedback to the external computer 4 and/or the external data memory 5 via the communication device 2, for example, relating to the continuously determined values of the torque delivered by the drive motor 9 to the tool 6, which is directly related to the instantaneous cutting power in the material of the workpiece 15. This acknowledged data is a valuable basis for the manufacturer of the machine tool 1 and also for the manufacturer of the tool 6 to continuously optimize the material-, tool-, and machine-specific process dataset specifications.

Figure 2:
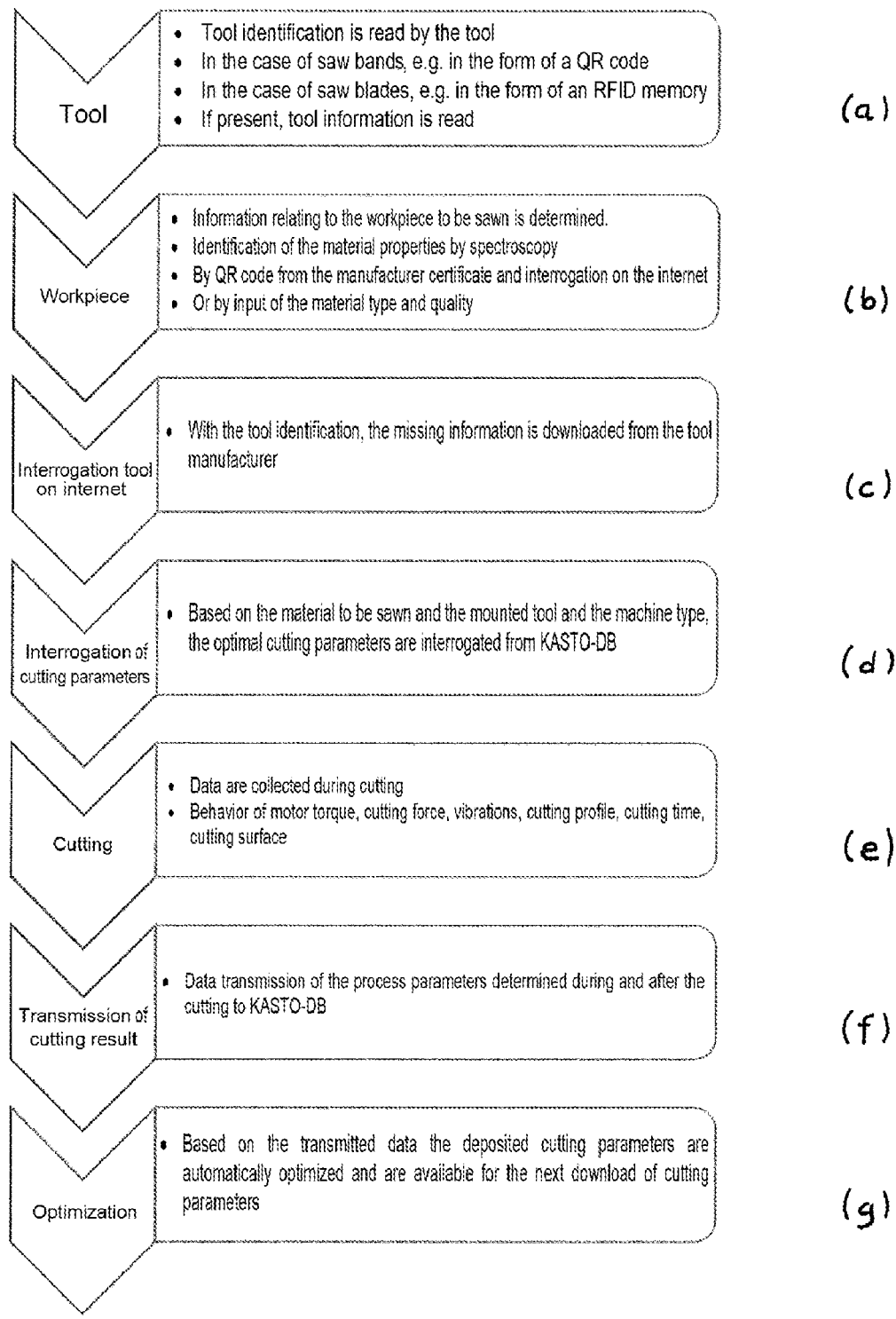
FIG. 2 shows a flow diagram for the function sequence in the system according to FIG. 1.

FIG. 2 shows a flow diagram for an exemplary function sequence of the system shown schematically in FIG. 1. In step (a) the tool 6 is identified and associated information is optionally read into the controller 17 by the sensor 19 of the detection means 18.

In step (b), information relating to the workpiece 15 to be sawn is determined, in particular specifically via the sensor 20 of the detection means 18. The workpiece 15 is thereby identified and/or material-specific information is already read into the controller 17.

In step (c) the controller 17 is connected via the communication device 2 to the external data memory 5 at the tool manufacturer and acquires further information about the tool 6.

In step (d) the controller 17 is connected by the communication device 2 via the Internet 3 to the external computer 4 at the manufacturer of the machine tool 1 in order to obtain an optimized process dataset with the optionally added information about the tool 6 and about the workpiece 15 to be sawn, in particular for controlling the drive motor 9 and the feed motor 13.

In step (e), data are collected during the sawing cut, in particular relating to the torque delivered to the tool 6 by the drive motor 9, relating to the cutting force which acts on the tool 6, relating to the vibrations, relating to a possible cutting profile, relating to the cutting time and as a result, also relating to the cutting surface.

During and after the sawing cut has been made, in step (f) data relating to the process parameters determined in step (e) are transmitted to the external computer 4 of the manufacturer of the machine tool 1.

In step (g) finally at the manufacturer of the machine tool 1, the process dataset specifications are optimized on the basis of the feedback. Since feedback from a plurality of machine tools of the same type generally arrive at the manufacturer, this optimization can be made using statistical methods and be available for the next download.

Figure 3:
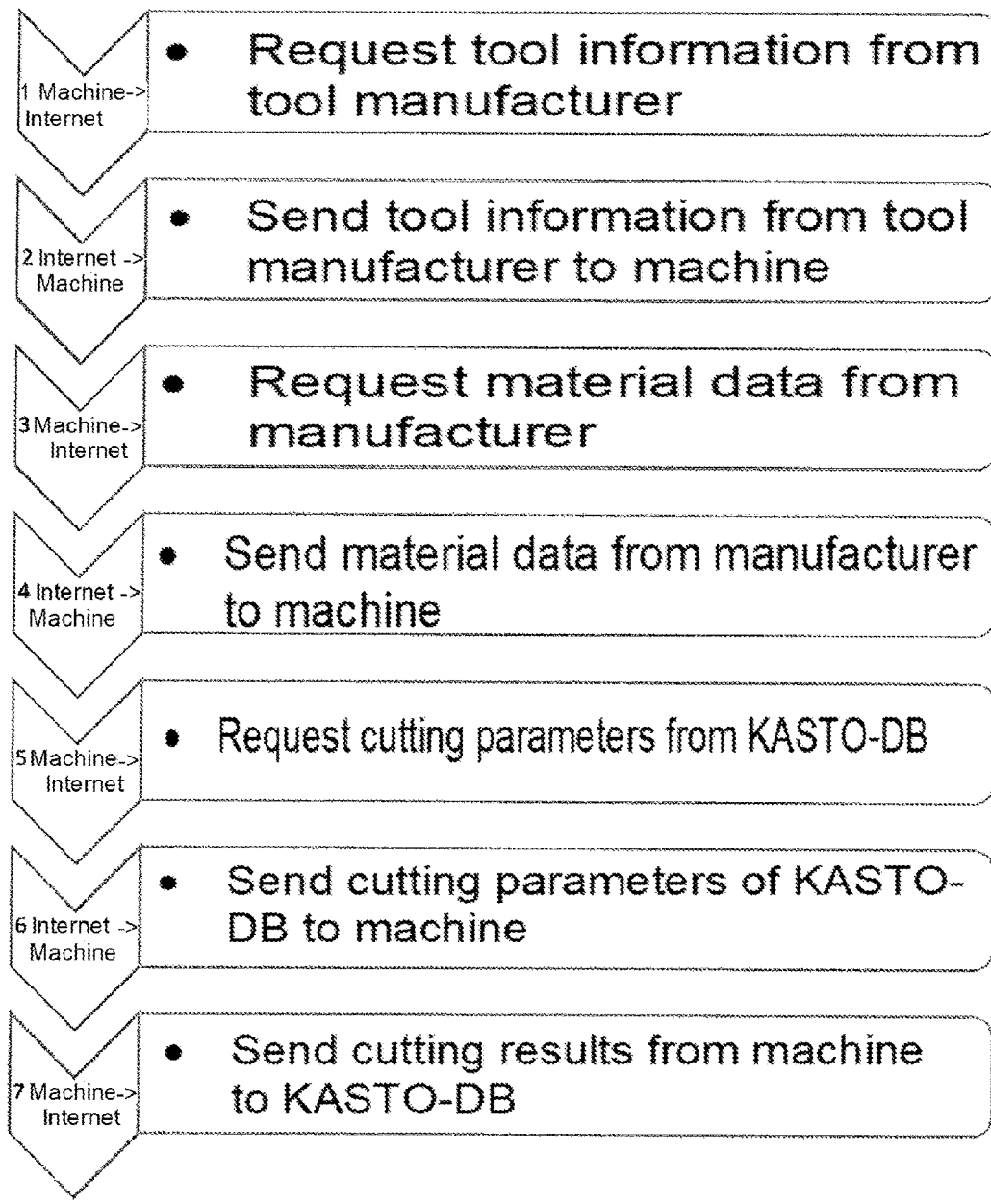
FIG. 3 shows a schematic diagram of the data transfer in the system according to FIG. 1.

FIG. 3 shows as an example a diagram of the data transfer in the system shown in FIG. 1, wherein FIGS. 4A-4D show code examples for each step 1 to 7 of the data transfer.

The invention claimed is:

1. A system for an optimized operation of a machine tool, comprising:
   a machine tool with a tool for metal cutting, the machine tool comprising
   a drive device for at least one of driving or moving the tool,
   a controller for the drive device that is adapted to at least one of control or regulate the drive device with a process dataset, and
   a communication device for data exchange;
   at least one of an external computer or at least one external data memory;
   the communication device is configured for data exchange between the controller of the machine tool and the at least one of the external data memory or the external computer;
   the controller contains an adjustment unit configured to download tool-specific process dataset specifications for the tool from at least one of the external data memory or the external computer and is configured to adjust a current process dataset in at least one of the data memory or computer with tool-specific process dataset specifications for the tool;

a sensor in communication with the controller, the sensor is configured to identify the tool;

at least one of the controller, the external data memory, or the external computer contains machine-specific correction values for at least individual ones of the tool-specific process dataset specifications in order to adapt the tool-specific process dataset specifications to the machine tool; and the controller of the machine tool includes an algorithm which determines at least one of machine-specific or material-specific correction values for the tool-specific process dataset specifications from process parameters which are determined by at least one of sensors or feedback of the drive device during operation of the machine tool or from operator inputs, and outputs said values by the adjustment unit to at least one of the external data memory or the external computer in order to modify the tool-specific process dataset specifications in a machine-specific manner.

2. The system of claim 1, wherein the machine tool is a sawing machine and the tool is a saw band.

3. The system as claimed in claim 1, wherein the at least one of the external data memory or the external computer include an algorithm that is adapted to determine a material to be machined by the machine tool from process parameters which are determined by at least one of sensors or feedback of the drive device during operation or a test operation of the controller of the machine tool and transmit to at least one of the external data memory or the external computer in order to adapt the tool-specific process dataset specifications using material-specific correction values.

4. A system for an optimized operation of a machine tool, comprising:

a machine tool with a tool for metal cutting, the machine tool comprising a drive device for at least one of driving or moving the tool, a controller for the drive device that is adapted to at least one of control or regulate the drive device with a process dataset, and a communication device for data exchange;

at least one of an external computer or at least one external data memory;

the communication device is configured for data exchange between the controller of the machine tool and the at least one of the external data memory or the external computer;

the controller contains an adjustment unit configured to download tool-specific process dataset specifications for the tool from at least one of the external data memory or the external computer and is configured to adjust a current process dataset in at least one of the data memory or computer with tool-specific process dataset specifications for the tool;

a sensor in communication with the controller, the sensor is configured to identify the tool;

at least one of the controller, the external data memory, or the external computer contains machine-specific correction values for at least individual ones of the tool-specific process dataset specifications in order to adapt the tool-specific process dataset specifications to the machine tool; and at least one of the external data memory or the external computer includes an algorithm that is configured to calculate material-specific correction values for the tool-specific process dataset specifications, from process parameters, which are determined by at least one of sensors or from feedback of the drive device during operation of the controller of the machine tool and/or from operator inputs and transmitted to the external data memory or the external computer in order to modify the tool-specific process dataset specifications in a machine-specific manner.

5. The system as claimed in claim 4, wherein a multiplicity of same-type machine tools communicate with a same one of the external data memory or the external computer and the same one of the external data memory or the external computer is configured so that they adapt the deposited tool-specific process dataset specifications by feedback obtained from the machine tools in a machine-specific manner.

6. The system as claimed in claim 5, wherein the external data memory contains the tool-specific process dataset specifications and the external computer holds in readiness at least one of machine-specific or material-specific correction values for the tool-specific process dataset specifications for the adjustment unit of the controller and by feedback obtained from the machine tools continuously adapts them in a machine-specific manner, in particular using statistical methods.

* * * * *